United States Patent
Potter et al.

(10) Patent No.: US 7,400,110 B2
(45) Date of Patent: Jul. 15, 2008

(54) SMART POWER CONVERTER

(75) Inventors: Calvin C. Potter, Mesa, AZ (US);
Andrew J. Brackenbury, Oro Valley, AZ (US); Gene H. Nishikida, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 229 days.

(21) Appl. No.: 11/345,161

(22) Filed: Jan. 31, 2006

(65) Prior Publication Data

US 2007/0176576 A1  Aug. 2, 2007

(51) Int. Cl.
*H02P 27/04* (2006.01)

(52) U.S. Cl. ...................................... 318/801
(58) Field of Classification Search .................. 318/801
See application file for complete search history.

(56) References Cited

U.S. PATENT DOCUMENTS

| | | | |
|---|---|---|---|
| 4,931,715 A * | 6/1990 | Lee et al. ................ | 318/709 |
| 5,267,135 A | 11/1993 | Tezuka et al. | |
| 5,375,051 A | 12/1994 | Decker et al. | |
| 5,428,523 A | 6/1995 | McDonnal | |
| 5,682,303 A | 10/1997 | Goad | |
| 5,903,139 A | 5/1999 | Kompelien | |
| 6,166,934 A | 12/2000 | Kajouke et al. | |
| 6,314,099 B1 | 11/2001 | Fujisawa et al. | |
| 6,515,379 B1 | 2/2003 | Nojima et al. | |
| 6,522,030 B1 | 2/2003 | Wall et al. | |
| 6,735,704 B1 | 5/2004 | Butka et al. | |
| 6,754,092 B2 | 6/2004 | McDowell et al. | |
| 6,759,762 B2 | 7/2004 | Barton | |
| 6,819,011 B2 | 11/2004 | Kernahan et al. | |
| 6,856,045 B1 | 2/2005 | Beneditz et al. | |
| 2003/0080624 A1 | 5/2003 | Belson et al. | |
| 2003/0174005 A1* | 9/2003 | Latham et al. ............ | 327/172 |
| 2004/0021371 A1 | 2/2004 | Jouper | |

* cited by examiner

*Primary Examiner*—Lincoln Donovan
*Assistant Examiner*—Erick Glass
(74) *Attorney, Agent, or Firm*—Ingrassia, Fisher & Lorenz, P.C.

(57) ABSTRACT

A smart power conversion and control system and method converts source AC power at a first voltage level to DC power at a second voltage level that is less than the first voltage level. Upon receipt of a command signal, a portion of the system is enabled to further convert the source AC power to regulated DC power at a voltage level that is less than the first voltage level and greater than the second voltage level. One or more relatively high voltage DC loads are then energized with the regulated DC power. When the portion of the system is not enabled, the source AC power is not converted.

18 Claims, 2 Drawing Sheets

SMART POWER CONVERTER

TECHNICAL FIELD

The present invention relates to power conversion and control and, more particularly, to a system and method for efficiently converting and controlling power to high voltage and low voltage loads.

BACKGROUND

The electrical power distribution system in many environments, including both land and seagoing environments, utilizes one or more high voltage power distribution busses to distribute electrical power for use by various electrical loads. Some of these electrical loads may be relatively low power devices that rely, for example, on relatively low voltage, regulated power. However, in some instances, the high voltage power distribution bus may be the only power source available from which to energize these relatively low voltage devices. Thus, one or more additional power conversion and regulation circuits may be needed to properly energize these electrical loads.

Although the use of additional power conversion and regulation circuits is generally safe, robust, and reliable, it can suffer certain drawbacks. For example, voltage reduction circuits can, in some instances, be relatively inefficient, as can any additional regulation circuits that may be included. Moreover, the power conversion circuits can also generate undesirable current harmonics. In addition, the power conversion and regulation circuits can result in larger overall component packages.

Hence, there is a need for a system and method that addresses one or more of the above-noted drawbacks. Namely, a system and method that allows relatively low power devices to be energized via a relatively high voltage power bus and is more efficient than current systems and methods, and/or generates less current harmonics than current systems and methods, and/or results in a smaller overall component package than current systems and methods. The present invention addresses one or more of these needs.

BRIEF SUMMARY

The present invention provides a system and method for efficiently converting and controlling power to high voltage and low voltage loads. In one embodiment, and by way of example only, a power converter system includes a step-down device, a low power control circuit, and a high power regulator circuit. The step-down device is adapted to receive source AC power at a first voltage level and is configured, upon receipt of the source AC power, to supply stepped-down AC power at a second voltage level that is less than the first voltage level. The low power control circuit is coupled to receive power that is supplied by the step-down device. The low power control circuit is operable, upon receipt of a command signal, to supply an enable signal. The high power regulator circuit is adapted to receive the source AC power and is coupled to receive the enable signal from the low power control circuit. The high power regulator circuit is configured, upon receipt of the enable signal, to convert the source AC power to regulated DC power at a third voltage level that is less than the first voltage level and greater than the second voltage level.

In another exemplary embodiment, an actuator power and control system includes a step-down transformer, a low power control circuit, a high power regulator circuit, an inverter circuit, and a motor. The step-down transformer is adapted to receive source AC power at a first voltage level and is configured, upon receipt of the source AC power, to supply stepped-down AC power at a second voltage level that is less than the first voltage level. The low power control circuit is coupled to receive power supplied by the step-down device. The low power control circuit is operable, upon receipt of a command signal, to supply an enable signal, inverter control signals, and relatively low voltage, regulated DC power to one or more electrical loads. The high power regulator circuit is adapted to receive the source AC power and is coupled to receive the enable signal from the low power control circuit. The high power regulator is configured, upon receipt of the enable signal, to convert the source AC power to regulated DC power at a third voltage level that is less than the first voltage level and greater than the second voltage level. The inverter circuit is coupled to receive the regulated DC power supplied by the high power regulator circuit and the inverter control signals from the low power control circuit and is operable, upon receipt thereof, to convert the regulated DC power to AC power. The motor is coupled to receive the AC power supplied by the inverter circuit and is operable, upon receipt thereof, to rotate.

In yet another exemplary embodiment, a method of controlling the supply of relatively high voltage, regulated DC power to one or more loads includes supplying source AC power at a first voltage level, converting the source AC power to DC power at a second voltage level that is less than the first voltage level, and supplying a command signal. In response to the command signal, the source AC power is converted to regulated DC power at a voltage level that is less than the first voltage level and greater than the second voltage level, and the relatively high voltage DC load is energized with the regulated DC power.

Other independent features and advantages of the preferred power conversion and control system and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
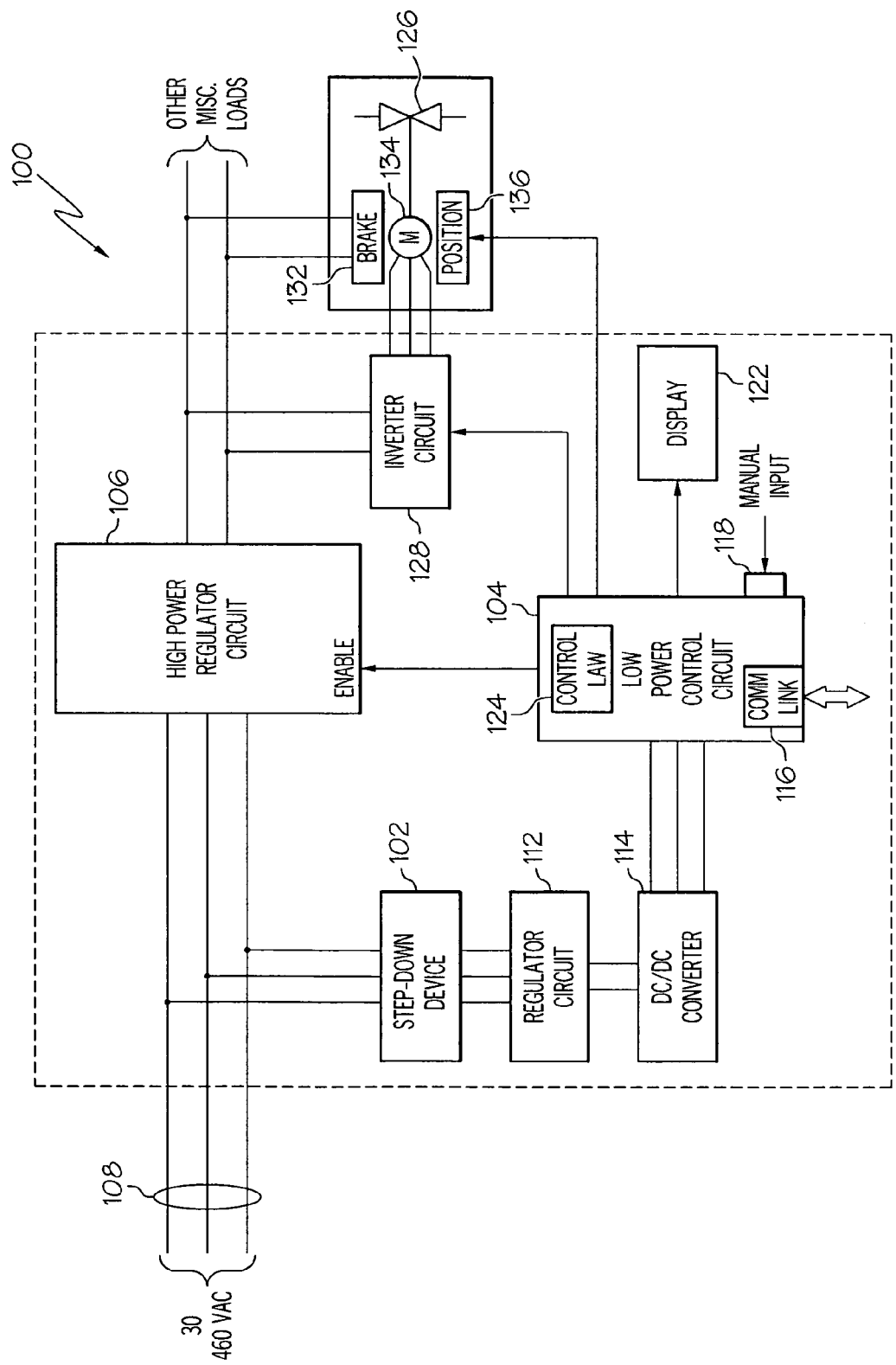
FIG. 1 is a functional block diagram of a smart power conversion and control circuit according to an embodiment of the present invention.

Turning now to FIG. 1, a functional block diagram of an exemplary smart power conversion and control system 100 is depicted, and includes a step-down device 102, a low power control circuit 104, and a high power regulator circuit 106. The step-down device 102 is coupled to an AC power source 108 that supplies source AC power at a first, relatively high voltage level. Although the configuration of the AC power source may vary, in the depicted embodiment the power source 108 is an AC power distribution bus 108. It will be appreciated that the specific voltage level, and number of phases, at which the power source 108 supplies the AC power may also vary. In the depicted embodiment, however, the AC power is 3-phase, 460 VAC power.

The step-down device 102 receives the source AC power from the AC power source 108 and steps down the voltage, from the first voltage level to a second voltage level that is less than the first voltage level, to thereby supply stepped-down AC power. It will be appreciated that the step-down device 102 may be implemented using any one of numerous types of devices, now known or developed in the future, for stepping down the voltage level of the source AC power. Preferably, however, the step-down device 102 is implemented as a step-down transformer, and most preferably uses a relatively high efficiency transformer, to minimize power loss in the system 100. For example, in a particular preferred embodiment the step-down transformer 102 is selected to have an efficiency of at least about 98-percent.

No matter how the step-down device 102 is specifically implemented, it is used to supply power to the low power control circuit 104. It will be appreciated that the step-down device 102 and the low power control circuit 104 could be configured such that the step-down device 102 supplies stepped down AC power directly to the low power control circuit 104. In the depicted embodiment, however, the low power control circuit 104 is powered by the step-down device 102 via a low power regulator circuit 112 and a DC/DC converter circuit 114. Thus, before describing the low power control circuit 104, a brief description of the low power regulator circuit 112 and the DC/DC converter circuit 114 will be provided.

The low power regulator circuit 112 is coupled to receive the stepped down AC power supplied by the step-down device 102 and is configured to rectify the AC power to DC power, and to supply DC power at a substantially constant, regulated voltage level. The DC/DC converter circuit 114 receives the DC power supplied from the low power regulator circuit 112 and is configured to supply a plurality of low power, regulated DC voltage signals. It will be appreciated that the number of regulated DC voltage signals, and the specific voltage levels, supplied by the DC/DC converter may vary depending, for example, on the voltage levels at which the low power control circuit 104 operates. For example, the DC/DC converter circuit 114 could be configured to supply ±15 VDC, ±30 VDC, or any one of numerous voltage levels or combinations of voltage levels. It will additionally be appreciated that the low power regulator circuit 112 and the DC/DC converter circuit 114 may each be implemented using any one of numerous circuit configurations, now known or developed in the future, for carrying out the functions described herein. It is further noted that the low power regulator 112 may be implemented using any one of numerous conventional, low power diode rectifier circuits and techniques, without concern for unwanted harmonic generation. No matter how each of these circuits is implemented, and the specific number and voltage values supplied thereby, the DC/DC converter circuit 114 supplies the low power, regulated DC voltage signals to the low power control circuit 104.

The low power control circuit 104 is, as was just described, energized with the low power, regulated DC voltage signals supplied from the DC/DC converter 114. The low power control circuit 104 includes a digital communication link 116 and a user interface 118, both of which may be used to receive a command signal. The digital communication link 116 is preferably configured as a serial data link, and may be implemented using either hard-wired communication, wireless radio frequency (RF) communication, or optical communication. Similarly, the user interface 118 may be implemented using any one of numerous types of user interface configurations including, for example, any one of numerous types of knobs, switches, or buttons.

No matter how the digital communication link 116 and the user interface 118 are configured and implemented, each, as was just noted, is used to receive a command signal. In response to the command signal, whether it is received via the digital communication link 116 or the user interface 118, the low power control circuit 104 generates an enable signal. The enable signal, as is depicted in FIG. 1, is supplied to the high power regulator circuit 106 and, as will be described further below, enables its operation. The low power control circuit 104 is additionally responsive to the command signal to supply power and display signals to a display 122 or other man-machine interface feedback device, and to implement a control law 124. The low power control circuit 104 may also supply power to one or more other relatively low voltage DC loads.

The control law 124 that the low power control circuit 104 implements may vary depending, for example, on the particular component or components that the smart power conversion and control system 100 is controlling. In the depicted embodiment, the smart power conversion and control system 100 is being used to control the position of a motor-driven valve 126, and the control law 124 implemented by the low power control circuit 104 is a closed-loop control law. Thus, as FIG. 1 additionally depicts, the low power control circuit 104, in response to the command signal, is further configured to supply control signals to, for example, an inverter circuit 128, and additionally supplies power to and receives component status feedback signals, such as position feedback signals, from the motor-driven valve 126.

Preferably, and as will be described in more detail further below, the low power control circuit 104 is configured to function in both a "sleep mode" and an "awake mode." In the sleep mode, the low power control circuit 104 consumes little power and does not supply power, display, control, or enable signals, and does not process feedback signals. It will be appreciated that the low power control circuit 104 normally operates in the sleep mode, and transitions to the awake mode upon receipt of a command signal, via either the digital communication link 116 or the user interface 118. Upon transition to the awake mode, the low power control circuit 104 supplies power, display, control, and the enable signal, and processes feedback signals until the valve 126 is moved to the commanded position. Thereafter, the low power control circuit 104 once again transitions to the sleep mode. In this manner, power consumption in the system 100 is minimized.

Power consumption in the system 100 is further minimized by the manner in which the high power regulator circuit 106 operates. The high power regulator circuit 106 is coupled to the AC power source 108 and, like any one of numerous other known high power regulator circuits, is configured to convert the source AC power to relatively high voltage, regulated DC power at a third voltage level that is less than the first voltage level and greater than the second voltage level. However, unlike numerous other high power regulator circuits, the high power regulator circuit 106 included in the depicted system 100 does not implement this functionality unless it receives the enable signal from the low power control circuit 104. More specifically, when the low power control circuit 104 is not supplying the enable signal, the high power regulator circuit 106 is disabled and not drawing power (or is at most drawing relatively insignificant levels of power) from the AC power source 108. Conversely, when the low power control circuit 104 does supply the enable signal, the high power regulator circuit 106 is enabled and supplies relatively high voltage, regulated DC power to various high power DC loads. In a particular physical embodiment, the third voltage level is, for example, ±270 VDC. It will be appreciated, however, that this value is merely exemplary of one particular embodiment, and that the value of the third voltage level may vary, above and below this value, depending, for example, on the particular high power DC loads being energized.

In addition to variations in the third voltage level value, the specific loads that are selectively powered by the high power regulator circuit 106 may vary. In the depicted embodiment, however, the high power regulator circuit 106 is used to selectively supply relatively high voltage, regulated DC power to the inverter circuit 128 and to one or more miscellaneous high voltage DC loads. Although the specific number and type of high voltage DC loads may vary, in the depicted embodiment at least one of the high voltage DC loads is an electric brake 132. The brake 132 is movable between a lock position and a release position, and is configured to either prevent or allow, respectively, rotation of a motor 134. In particular, the brake 132, upon being energized by the high power regulator circuit 106, moves to a release position, which allows the motor 134 to rotate. When the brake 132 is not being energized by the high power regulator circuit 106, it moves to the lock position, thereby preventing the motor 134 from rotating.

The motor inverter circuit 128, in response to the control signals supplied thereto from the low power control circuit 104, converts the relatively high voltage, regulated DC power to AC power. The AC power is in turn supplied to the motor 134. The motor 134, upon receipt of the AC power supplied thereto from the inverter circuit 128, and upon the brake 132 being energized and moved to its release position, rotates to thereby move the valve 126 to a commanded position. It will be appreciated that the inverter circuit 128 may be implemented using any one of numerous inverter topologies and may, in conjunction with the control signals supplied thereto from the low power control circuit 104, be configured to implement any one of numerous inverter control schemes. It will additionally be appreciated that the inverter circuit 128 may be eliminated from the system if, rather than using an AC-type motor, the motor 134 is implemented using, for example, a brushless DC motor.

As was previously noted, in addition to being driven by the motor 134, the valve 126 also supplies position feedback signals to the low power control circuit 104 for use in the control law 124. In the depicted embodiment, the position feedback signal is supplied from a position sensor 136. It will be appreciated that the position sensor (136) may be implemented or any one of numerous types of position sensors including, but not limited to, an LVDT, an RVDT, and a potentiometer It will additionally be appreciated that the position sensor 136 could be energized from either the low power control circuit 104 or the high power regulator circuit 106. In the depicted embodiment, the position sensor 136 is energized from the low power control circuit 104.

Figure 2:
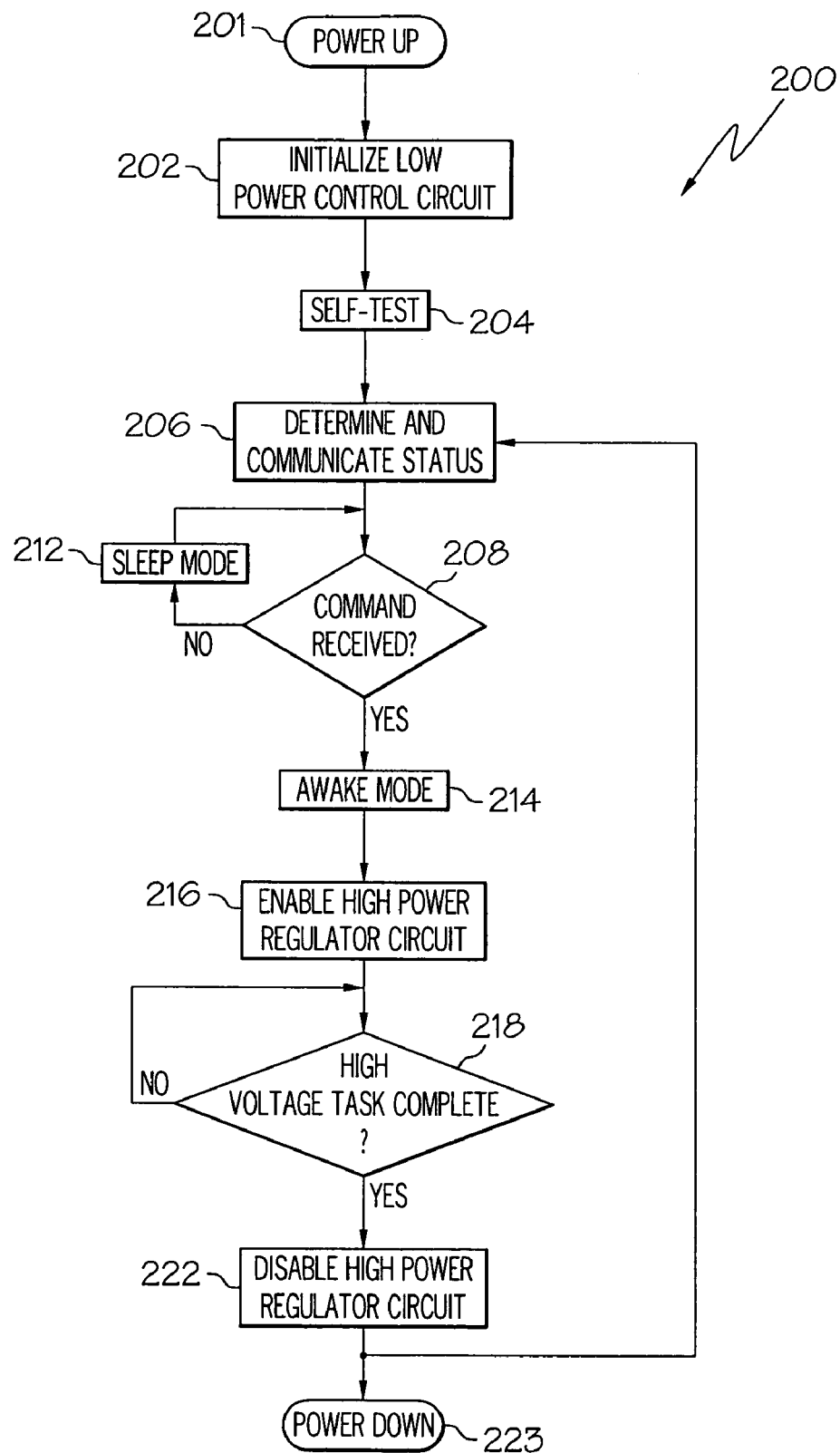
FIG. 2 is a flowchart depicting an exemplary process that may be carried out by the circuit of FIG. 1.

Having described the overall structure and general function of the power conversion and control system 100, a more detailed description of the overall process that is implemented by the system 100 will now be provided. In doing so, reference should be made to FIG. 2, which depicts an exemplary embodiment of the process 200 in flowchart form, in combination with FIG. 1, as needed. It will be appreciated that the parenthetical references in the following discussion correspond to the flowchart blocks shown in FIG. 2. It will additionally be appreciated that the process 200 is preferably implemented in software, and is preferably (though not necessarily) carried out via one or more non-illustrated processors that reside in the low power control circuit 104.

With the above background in mind, it is seen that upon power-up of the system 100 (201), the low power control circuit 104 is initialized (202) and runs one or more self-tests (204). These self-tests may include one or more diagnostic routines of only the low power control circuit 104 itself, the low power control circuit 104 and selected other circuits within the system 100, or of the entire system 100. Preferably, however, the self-tests include diagnostic routines that are conducted on the entire system 100. Upon completion of the self-tests (204), the status of the system 100, including the results of the self-tests, is determined and communicated to one or more external systems (206).

After the system status has been determined and communicated, the low power control circuit 104 then determines whether it is being supplied with a command signal (208). If no command signal is being supplied to the low power control circuit 104, the low power control circuit 104 configures itself into the previously mentioned sleep mode (212). Thus, the display 122 and any other low voltage DC loads coupled to receive power from the low power control circuit are deenergized. The low power control circuit 104 also does not generate the enable signal in the sleep mode (212), which means the high power regulator circuit 106 is disabled. The low power control circuit 104 remains in the sleep mode (212) until a command signal is supplied thereto, via either the digital communication link 116 or the user interface 118. In either case, when the low power control circuit 104 receives a command signal, it reconfigures itself to the awake mode (214).

In the awake mode (214), as was previously alluded to, the low power control circuit 104 supplies power to the display 122 and any other low voltage DC loads coupled to receive power therefrom. The low power control circuit 104 additionally supplies display commands to the display, generates and supplies appropriate control signals to the inverter circuit 128, and processes position feedback signals supplied from the position sensor 136. The low power control circuit 104 additionally generates and supplies the enable signal to the high power regulator circuit 106 (216). As described above, the high power regulator circuit 106, upon receipt of the enable signal from the low power control circuit 104, converts the source AC power to relatively high voltage, regulated DC power, and supplies this DC power to the inverter circuit 128 and the brake 132. Upon being energized, the brake 132 moves to its release position, which allows the motor 134, upon being appropriately energized, to rotate.

The low power control circuit 104 continues to supply the enable signal to the high power regulator circuit 106 until the high voltage task is complete (218). In the depicted embodiment, the high voltage task is movement of the valve 126 to the commanded position. Thus, until the valve 126 is in the commanded position, the low power control circuit 104 will continue to generate and supply the enable signal (216). However, when the valve 126 is moved to the commanded position, which means the high voltage task is complete (218), the low power control circuit 104 ceases generating the enable signal, and disables the high power regulator circuit 106 (222). Thereafter, the previously described steps of determining and communicating system status (206), and awaiting a command signal (208), are repeated.

The smart power conversion and control system 100 described herein more efficiently energizes relatively low power devices from a relatively high voltage power bus than current systems and methods. The system additionally generates less current harmonics than current systems and methods, and provides a system with a smaller overall component package than current systems and methods.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A power converter system, comprising:
   a step-down device adapted to receive source AC power at a first voltage level and configured, upon receipt of the source AC power, to supply stepped-down AC power at a second voltage level that is less than the first voltage level;
   a low power regulator circuit coupled to receive the stepped-down AC power from the step-down device and operable, upon receipt thereof, to supply relatively low voltage, regulated DC power;
   a low power control circuit coupled to receive a command signal, and power that is supplied by the low power regulator circuit, the low power control circuit operable, upon receipt of the command signal, to supply an enable signal; and
   a high power regulator circuit adapted to receive the source AC power and coupled to receive the enable signal from the low power control circuit, the high power regulator configured, upon receipt of the enable signal, to convert the source AC power to regulated DC power at a third voltage level that is less than the first voltage level and greater than the second voltage level.

2. The power converter of claim 1, further comprising:
   a DC/DC converter coupled to receive the relatively low voltage, regulated DC power from the low power regulator and operable, upon receipt thereof, to supply a plurality of low power, regulated DC voltage signals to the low power control circuit.

3. The power converter of claim 1, wherein:
   the low power control circuit further comprises a digital communication link; and
   the command signals are supplied to the low power converter via the digital communication link.

4. The power converter of claim 1, wherein:
   the low power control circuit further comprises a user interface, the user interface configured to receive input from a user; and
   the command signals are supplied to the low power converter via the user interface.

5. The power converter of claim 1, wherein:
   the low power control circuit is further operable, upon receipt of the command signal, to supply low voltage, regulated DC power; and
   the system further comprises a display coupled to receive the relatively low voltage, regulated DC power supplied by the low power control circuit.

6. The power converter of claim 5, wherein the low power control circuit is further coupled to receive one or more component status feedback signals representative of a status of a component and operable, upon receipt thereof, to supply a component status signal representative thereof.

7. The power converter of claim 6, wherein the display is further coupled to receive the component status signal and operable, upon receipt thereof, to render an image representative of the status of the component.

8. The power converter of claim 7, wherein the step-down device comprises a step-down transformer.

9. The power converter of claim 1, wherein:
   the low power control circuit is further operable, upon receipt of the command signal, to supply inverter command signals; and
   the system further comprises an inverter circuit coupled to receive the regulated DC power supplied by the high power regulator circuit and the inverter commands supplied by the low power control circuit and operable, upon receipt thereof, to convert the relatively regulated DC power to AC power.

10. An actuator power and control system, comprising:
    a step-down device adapted to receive source AC power at a first voltage level and configured, upon receipt of the source AC power, to supply stepped-down AC power at a second voltage level that is less than the first voltage level;
    a low power regulator circuit coupled to receive the stepped-down AC power from the step-down device and operable, upon receipt thereof, to supply relatively low voltage, regulated DC power;
    a low power control circuit coupled to receive (i) power supplied by the low power regulator circuit and (ii) a command signal, the low power control circuit operable, upon receipt of the command signal, to supply (i) an enable signal, (ii) inverter control signals, and (iii) relatively low voltage, regulated DC power to one or more electrical loads;
    a high power regulator circuit adapted to receive the source AC power and coupled to receive the enable signal from the low power control circuit, the high power regulator configured, upon receipt of the enable signal, to convert the source AC power to regulated DC power at a third voltage level that is less than the first voltage level and greater than the second voltage level;
    an inverter circuit coupled to receive the regulated DC power supplied by the high power regulator circuit and the inverter control signals from the low power control circuit and operable, upon receipt thereof, to convert the regulated DC power to AC power; and
    a motor coupled to receive the AC power supplied by the inverter circuit and operable, upon receipt thereof, to generate a rotational drive force.

11. The actuator power and control system of claim 10, further comprising:
    a DC/DC converter coupled to receive the relatively low voltage, regulated DC power from the low power regulator and operable, upon receipt thereof, to supply a plurality of low power, regulated DC voltage signals to the low power control circuit.

12. The actuator power and control system of claim 9, wherein:
    the low power control circuit further comprises a digital communication link; and
    the command signals are supplied to the low power converter via the digital communication link.

13. The actuator power and control system of claim 9, wherein:
    the low power control circuit further comprises a user interface, the user interface configured to receive input from a user; and the command signals are supplied to the low power converter via the user interface.

14. The actuator power and control system of claim 10, wherein:
the low power control circuit is further operable, upon receipt of the command signal, to supply low voltage, regulated DC power; and
the system further comprises a display coupled to receive the relatively low voltage, regulated DC power supplied by the low power control circuit.

15. The actuator power and control system of claim 14, wherein:
the low power control circuit is further coupled to receive one or more component status feedback signals representative of a status of a component and operable, upon receipt thereof, to supply a component status signal representative thereof; and
the display is further coupled to receive the component status signal and operable, upon receipt thereof, to render an image representative of the status of the component.

16. The actuator power and control system of claim 15, further comprising:
a brake movable between a lock position, in which it prevents rotation of the motor, and a release position in which it allows rotation of the motor, the brake coupled to receive the regulated DC power supplied by the high power regulator circuit and configured, upon receipt thereof, to move to the release position.

17. A method of controlling the supply of relatively high voltage, regulated DC power to one or more loads, comprising the steps of:
supplying source AC power at a first voltage level;
converting the source AC power to DC power at a second voltage level that is less than the first voltage level;
supplying a position command signal representative of a commanded position for a component; and
in response to the command signal:
converting the source AC power to regulated DC power at a third voltage level that is less than the first voltage level and greater than the second voltage level,
energizing the relatively high voltage DC load with the regulated DC power,
determining a position of the component, and
ceasing the conversion of the source AC power to the regulated DC power at the third voltage level when the determined position reaches the commanded position.

18. The method of claim 17, further comprising:
converting the regulated DC power to AC power; and
supplying the AC power to a motor.

* * * * *